United States Patent
Merle et al.

Patent Number: 5,465,920
Date of Patent: Nov. 14, 1995

[54] TOOL AND METHOD FOR DETACHING A TRAILING END PORTION OF A FILMSTRIP FROM AT LEAST ONE HOOK ATOP A RAMP ON A FILM SPOOL INSIDE A FILM CARTRIDGE

[75] Inventors: Thomas C. Merle; Dale W. Ryan; David L. Rowden, all of Rochester, N.Y.

[73] Assignee: Eastman Kodak Company, Rochester, N.Y.

[21] Appl. No.: 98,112

[22] Filed: Jul. 27, 1993

[51] Int. Cl.⁶ .................................................. G03B 1/56
[52] U.S. Cl. ............................................... 242/348.1
[58] Field of Search .............................. 242/550, 348, 242/348.1, 348.3

[56] References Cited

U.S. PATENT DOCUMENTS

| | | | |
|---|---|---|---|
| 3,864,993 | 2/1975 | Hovind | 81/3 R |
| 4,047,653 | 9/1977 | Starr | 226/92 |
| 4,074,870 | 2/1978 | Kaufman | 242/1 |
| 4,113,192 | 9/1978 | Osanai | 242/1 |
| 4,334,750 | 6/1982 | Fichter | 242/348.1 X |
| 4,685,209 | 8/1987 | Takahashi | 29/806 |
| 4,834,310 | 5/1989 | Ikariya et al. | 242/74 |
| 4,852,821 | 8/1989 | Harris et al. | 242/71.8 |
| 4,978,084 | 12/1990 | Harris et al. | 242/74 |
| 5,093,686 | 3/1992 | Shigaki | 355/77 |
| 5,215,273 | 6/1993 | Greeve | 242/348 X |

FOREIGN PATENT DOCUMENTS

| | | |
|---|---|---|
| 0342372A2 | 11/1989 | European Pat. Off. . |
| 0582852A1 | 2/1994 | European Pat. Off. . |
| 2006593 | 8/1971 | France . |
| 62240957 | 10/1967 | Japan . |
| 44-8856 | 4/1969 | Japan . |
| 4-123048 | 4/1992 | Japan . |
| 4-122925 | 4/1992 | Japan . |

*Primary Examiner*—John P. Darling
*Attorney, Agent, or Firm*—David A. Howley

[57] ABSTRACT

A tool for detaching a trailing end portion of a filmstrip from at least one hook atop a ramp on a film spool inside a film cartridge. This detachment occurs when the tool is inserted inwardly through a film ingress/egress slot in the cartridge. The tool includes a flexible element having a leading first portion followed by a wider second portion each configured to be successively inserted inwardly through the slot of the cartridge beneath a film section in the slot such that when the wider second portion is forced to slide up the ramp on the spool the leading first portion will push the trailing end portion of the filmstrip off the hook atop the ramp.

7 Claims, 3 Drawing Sheets

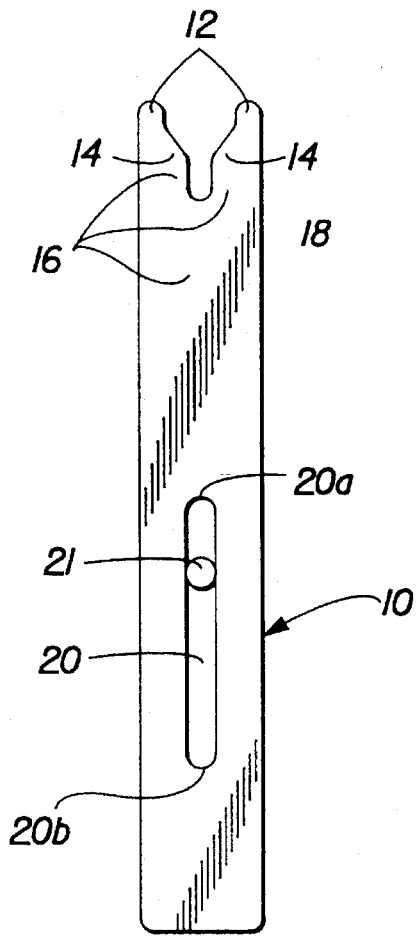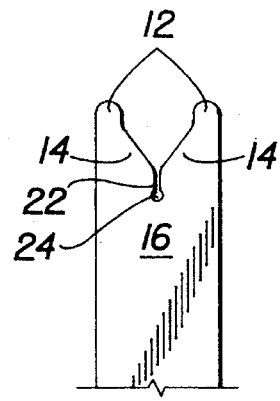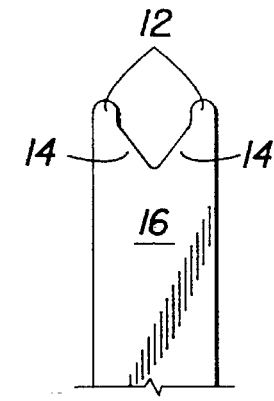
FIG.1  FIG.2A  FIG.2B
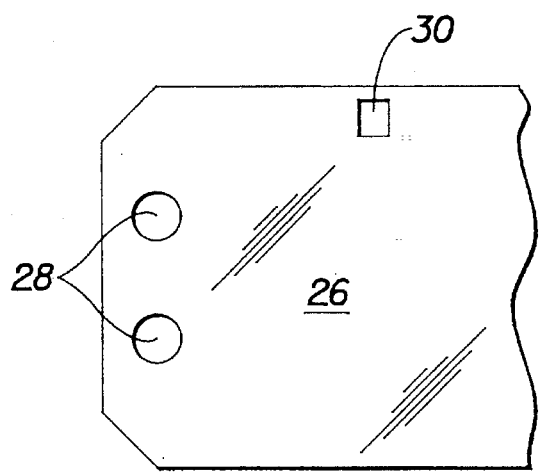
FIG.3

TOOL AND METHOD FOR DETACHING A TRAILING END PORTION OF A FILMSTRIP FROM AT LEAST ONE HOOK ATOP A RAMP ON A FILM SPOOL INSIDE A FILM CARTRIDGE

FIELD OF THE INVENTION

This invention relates generally to the field of photography, and more particularly to a tool for detaching a trailing end portion of a filmstrip from at least one hook atop a ramp on a film spool inside a film cartridge.

BACKGROUND OF THE INVENTION

In conventional photographic film cartridges, a photographic filmstrip is wound on a spool within the cartridge. A trailing end portion of the filmstrip is secured to the spool. When it is time to process and print the images captured on the filmstrip, the filmstrip is permanently detached from its associated film cartridge. Typically, this detachment has been accomplished by tearing or cutting the image bearing portion of the filmstrip from the trailing end portion of the filmstrip. The main body of the filmstrip is processed and printed while the film cartridge, spool and filmstrip trailing end portion are discarded or recycled.

PROBLEM TO BE SOLVED BY THE INVENTION

It is desirable to be able to reattach the filmstrip to the spool and rewind the filmstrip into the film cartridge. As such, the film is protected, for example, during transport from processing to printing or during storage by the customer. When the filmstrip is cut or torn from the spool, the trailing end of the filmstrip, having a specific geometry which enables it to be attached to the spool, is damaged or lost. Consequently, the filmstrip cannot be reattached to the spool and rewound into the film cartridge.

SUMMARY OF THE INVENTION

According to one aspect of the invention, a tool is provided for detaching a trailing end portion of a filmstrip from at least one hook atop a ramp on a film spool inside a film cartridge. This detachment occurs when the tool is inserted inwardly through a film ingress/egress slot in the cartridge. The tool includes a flexible element having a leading first portion followed by a wider second portion each configured to be successively inserted inwardly through the slot of the cartridge beneath a film section in the slot such that when the wider second portion is forced to slide up the ramp on the spool the leading first portion will push the trailing end portion of the filmstrip off the hook atop the ramp.

BRIEF DESCRIPTION OF THE DRAWINGS

FIG. 1 is a schematic representation of a tool for detaching a trailing end portion of a filmstrip from a cartridge spool;

FIGS. 2A and 2B represent alternative embodiments of the lead portion of the tool of FIG. 1;

FIG. 3 is a schematic representation of a trailing end portion of a photographic filmstrip;

DETAILED DESCRIPTION OF THE INVENTION

Figure 4:
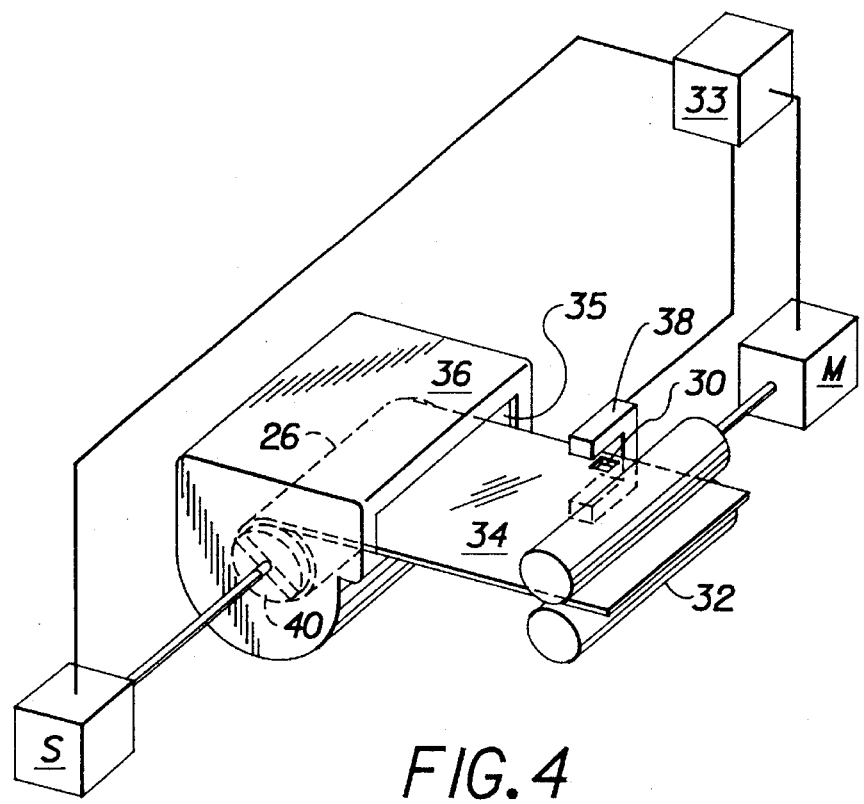
FIG. 4 is a perspective view of a film cartridge with film being removed therefrom.

Referring now to the drawings, FIG. 1 shows a tool 10 for detaching a trailing end portion of a filmstrip from a film spool inside a film cartridge. The tool is a flexible element made of a material such as plastic. The flexible element includes leading first portions 12 followed respectively by wider second portions 14. Preferably, the leading first portions are rounded to facilitate insertion into a film cartridge. The second portions are followed by a third portion 16 which extends from the second portions. Preferably the second portions are each tapered from the third portion to the first portion.

Third portion 16 defines a slot 18 which extends from an end of the second portions into the third portion. Third portion 16 also defines an aperture 20 which extends lengthwise along the third portion. A pin 21 extends into the slot and is movable along the length of the slot to move tool 10 into and out of a film cartridge.

FIGS. 2A and 2B represent alternative embodiments of the lead portion of tool 10. In FIG. 2A, a slit 22 and hole 24 replace slot 18 of FIG. 1. In FIG. 2B, there is no slot 18, slit 22 or hole 24 in third portion 16.

Turning now to FIG. 3, a trailing end portion 26 of a photographic filmstrip is displayed. The trailing end portion has a pair of hook apertures 28 and a detachment perforation 30.

Figure 5:
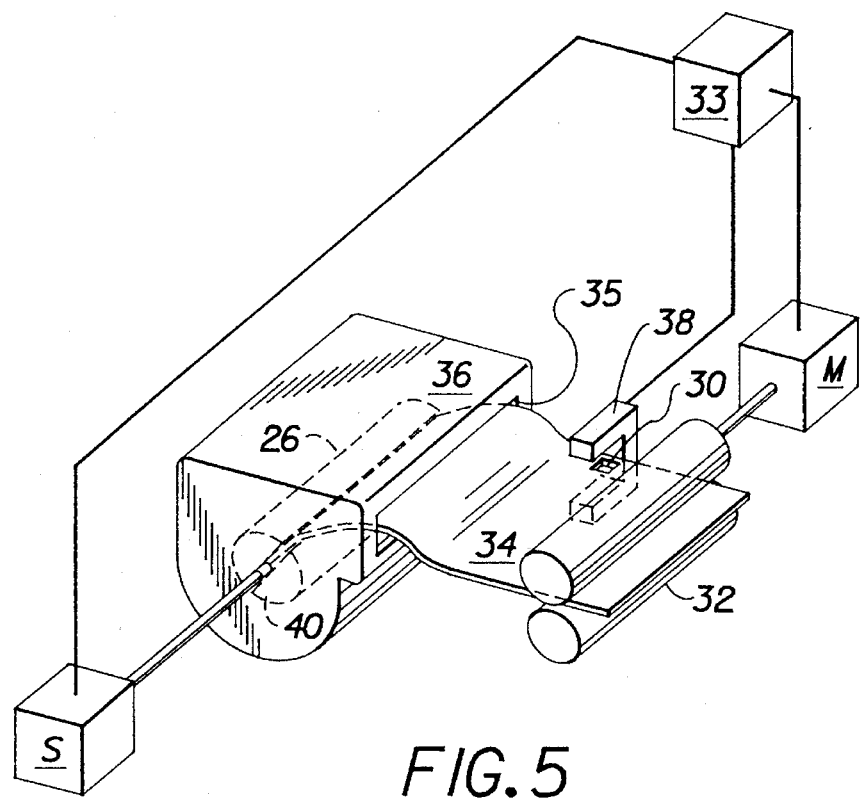
FIG. 5 is a perspective view of the film cartridge of FIG. 4 in which slack has been imparted into the filmstrip.

With regard to FIGS. 4 and 5, a pair of metering nip rollers 32, under the control of a logic and control unit (LCU) 33, are rotated by a motor M to withdraw a filmstrip 34 from a film ingress/egress slot 35 in a film cartridge 36. When filmstrip 34 has been withdrawn to the point where only about one wrap of filmstrip remains on a spool 40, detachment perforation 30 in filmstrip trailing end portion 26 is sensed by a sensor 38. Sensor 38 includes, for example, a light emitting diode and a charge coupled device. When sensor 38 detects detachment perforation 30, the sensor signals LCU 33 which causes motor M to stop rotating rollers 32, locking the filmstrip in place.

LCU 33 then actuates an angular positioning device, such as a stepper motor S, which accurately positions spool 40 at a predetermined angular location. Accurately positioning the spool serves two functions. First, spool 40 is positioned so that tool 10 can be inserted into the spool for detachment. Second, rotation of spool 40 by stepper motor S causes a small amount of slack to be imparted into the trailing end portion of the filmstrip. Having slack in the trailing end portion of the filmstrip facilitates removal of the trailing end portion from spool 40 by releasing the back side of hook apertures 28 from hooks 42. This approach to imparting slack into the film eliminates the need to reverse the direction of the filmstrip. Additionally, there is no precise motion control needed for the film handling system.

Figure 6:
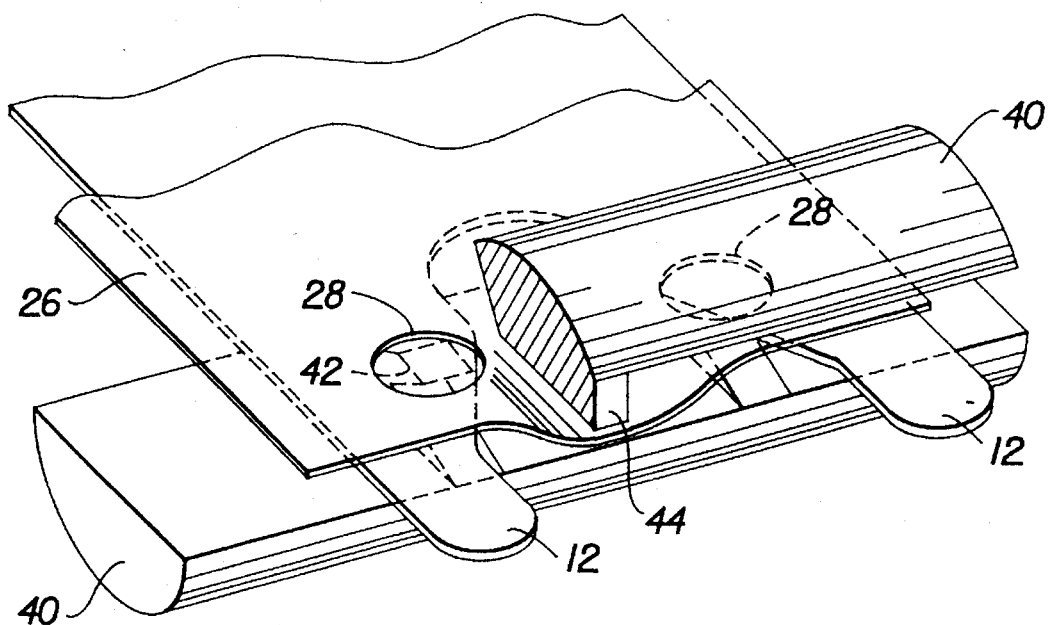
FIG. 6 is a perspective view of the tool of FIG. 1 being used to remove the trailing end portion of FIG. 2 from a cartridge spool.
Figure 7:
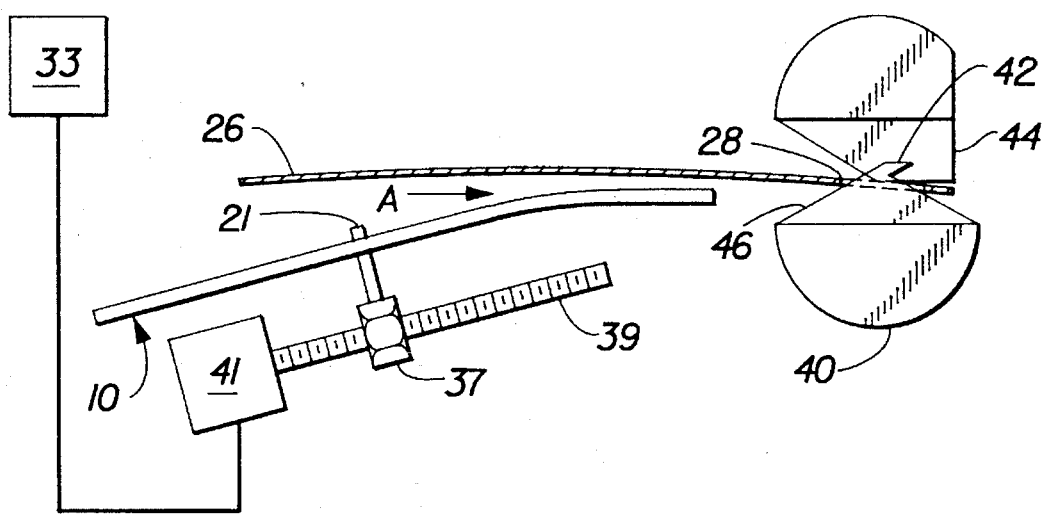
FIG. 7 is a side view of the tool of FIG. 1 being used to remove the trailing end portion of FIG. 2 from a cartridge spool.

Turning now to FIGS. 6 and 7, a description will now be provided as to how tool 10 is used to remove trailing end portion 26 from spool 40. FIG. 6 shows filmstrip trailing end portion 26 secured to spool 40 by a pair of hooks 42 (one hook is hidden from view) on spool 40 which protrude through hook apertures 28 in the filmstrip trailing end portion. The trailing end portion of the filmstrip is held on hooks 42 by a retention lug 44 which pushes a middle section of the filmstrip in a downward direction.

In order to insert tool 10 into cartridge 36, pin 21 is moved against an end 20a of aperture 20 (see FIG. 1). FIG. 7 shows the pin secured to a threaded nut 37. Nut 37 is threadingly engaged by a lead screw 39 which is driven by a motor 41. After spool 40 has been positioned by stepper motor S, LCU 33 actuates motor 41 which rotates lead screw 39. Rotation of the lead screw causes nut 37 and pin 21 to move in the direction of an arrow A. When pin 21 engages end 20a of aperture 20, tool 10 is moved towards cartridge 36.

Tool 10 is pushed against filmstrip trailing end portion 26 as the tool is being inserted into the cartridge such that the filmstrip trailing end portion assists in guiding tool 10 into film ingress/egress slot 35. Tool 10 is inserted, leading first portions first, into film ingress/egress slot 35 of cartridge 36. Tool 10 is further inserted into spool 40 such that second portions 14 of the tool respectively slide up a pair of ramps 46 (one is hidden from view) on spool 40. The tapering of second portions 14 (a) provides reliable tool movement along ramps 46 and (b) greatly reduces the chance that hook apertures 28 will get caught and damaged on the second portions.

As second portions 14 slide up ramps 46, first portions 12 of tool 10 engage the filmstrip trailing end portion 26 to remove the filmstrip trailing end portion from hooks 42. Slot 18, or slit 22 and hole 24, allows the trailing end portion of the filmstrip to deform around retention lug 44 on spool 40 when the trailing end portion of the filmstrip is pushed off of hooks 42. The slack in the filmstrip trailing end portion facilitates removal of the trailing end portion from the hooks. When tool 10 has been fully inserted into cartridge 36, LCU 33 stops rotation of lead screw 39.

After the filmstrip trailing end portion has been removed from hooks 42, pin 21 is moved away from end 20a of aperture 20 to a position between end 20a and an end 20b. The pin is moved by LCU 33 causing motor 41 to rotate lead screw 39 in an opposite direction. Movement of the pin to this position does not move tool 10, but allows the tool to be moved at a later step (described below). LCU 33 then causes motor M to rotate rollers 32 to withdraw the filmstrip trailing end portion from spool 40. The movement of the filmstrip trailing end portion causes first portions 12 and second portions 14 to likewise be withdrawn from the spool because the frictional forces between the tool and filmstrip cause the two to move in unison. By removing the tool from the spool at the same time the filmstrip trailing end portion is removed, the filmstrip trailing end portion is prevented from getting snagged on tool 10 or hooks 42. Tool 10 is then completely removed from cartridge 36 by moving pin 21 against end 20b of aperture 20.

There are advantages to using a flexible tool verses a rigid tool. With a flexible tool, the spool and film will not be damaged if the flexible tool is engaged into the spool in an improper position. The filmstrip trailing end portion and spool features guide the tool into the proper detach position, eliminating the need to accurately position a rigid tool.

The invention has been described with reference to a preferred embodiment. However, it will be appreciated that variations and modifications can be effected by a person of ordinary skill in the art without departing from the scope of the invention.

PARTS LIST FOR FIGS. 1–7

10 tool
12 leading first portions
14 wider second portions
16 third portion
18 slot
20 aperture
20a aperture end
20b aperture end
21 pin
22 slit
24 hole
26 filmstrip trailing end portion
28 hook apertures
30 detachment perforation
32 metering nip rollers
33 logic and control unit
34 filmstrip
35 film ingress/egress slot
36 film cartridge
37 nut
38 sensor
39 lead screw
40 spool
41 motor
42 hooks
44 retention lug
46 ramps
M Motor
S Stepper motor

What is claimed is:

1. A tool for detaching a trailing end portion of a filmstrip from at least one hook atop a ramp on a film spool inside a film cartridge, when said tool is inserted inwardly through a film ingress/egress slot in the cartridge, said tool comprising:

a flexible element having a leading first portion followed by a wider second portion each configured to be successively inserted inwardly through the slot of the cartridge beneath a film section in the slot such that when the wider second portion is forced to slide up the ramp on the spool the leading first portion will push the trailing end portion of the filmstrip off the hook atop the ramp, wherein an end of said first portion away from said second portion is rounded such that said first portion can be inserted into said film ingress/egress slot without becoming jammed.

2. The tool of claim 1, wherein said flexible element includes a third portion extending from said second portion, said third portion having an aperture running lengthwise along said third portion, said aperture being engageable by a pin such that when said pin is moved against one end of said aperture, said first portion and second portion are inserted inwardly through said film ingress/egress slot in the cartridge, when said pin is moved to a position between said one end of said aperture and an opposite end of said aperture, said first portion and second portion can be withdrawn from said spool by moving said trailing end portion of said filmstrip out of said spool, and when said pin is moved against said opposite end of said aperture, said first portion and second portion are withdrawn from said film ingress/ egress slot.

3. The tool of claim 2, wherein said second portion is tapered from said third portion to said first portion, thereby allowing said second portion to more easily slide up said ramp.

4. The tool of claim 2, wherein said third portion defines a slot extending from an end of said second portion into said third portion, said slot allowing said trailing end portion of said filmstrip to deform around a retention lug on said spool when said trailing end portion of the filmstrip is pushed off said hook.

5. The tool of claim 2, wherein said third portion has a slit extending from an end of said second portion into said third portion, said slit allowing said trailing end portion of said filmstrip to deform around a retention lug on said spool when said trailing end portion of the filmstrip is pushed off said hook.

6. A method of detaching a trailing end portion of a filmstrip from at least one hook atop a ramp on a film spool inside a film cartridge, said method comprising the steps of:

provjding a tool which includes a flexible element having a leading first portion followed by a wider second portion;

inserting said tool into an ingress/egress slot of said film cartridge beneath a film section in the slot such that the wider second portion is forced to slide up the ramp on the spool and the leading first portion pushes the trailing end portion of the filmstrip off the hook atop the ramp;

removing said trailing end portion of said filmstrip from said film cartridge; and imparting slack into said trailing end portion of said filmstrip inside said film cartridge prior to pushing said filmstrip trailing end portion off of said hook thereby facilitating the removal of said filmstrip trailing end portion from said hook.

7. The method of claim 6, wherein said removing step causes said first portion and second portion to be removed from said spool thereby allowing said filmstrip trailing end portion to be removed from said spool with minimal interference from said first portion, said second portion and said at least one hook.

* * * * *